United States Patent
Deters

[15] 3,692,050
[45] Sept. 19, 1972

[54] APPARATUS FOR DETECTING LEAKS IN A FLUID DELIVERY LINE

[72] Inventor: Elmer M. Deters, Muscatine, Iowa

[73] Assignee: Red Jacket Manufacturing Company, Davenport, Iowa

[22] Filed: May 10, 1971

[21] Appl. No.: 141,507

[52] U.S. Cl. ................................................137/491
[51] Int. Cl. ............................................F16k 31/12
[58] Field of Search .....................137/491; 73/40.5

[56] References Cited

UNITED STATES PATENTS

3,478,776  11/1969  Royer........................137/491

Primary Examiner—Henry T. Klinksiek
Attorney—McCanna, Morsbach, Pillote & Muir

[57] ABSTRACT

An apparatus for detecting leakage in excess of a preselected rate from a fluid delivery line through which fluid is intermittently delivered under pressure, the apparatus including a main valve which controls flow of fluid to the delivery line and having a pressure responsive operator, and a leak detecting pilot valve for controlling the application of fluid pressure to the pressure responsive operator of the main valve.

11 Claims, 7 Drawing Figures

PATENTED SEP 19 1972

Inventor
Elmer M. Deters

By
McCanna, Morsbach, Pillote & Muir
Attorneys

3,692,050

APPARATUS FOR DETECTING LEAKS IN A FLUID DELIVERY LINE

BACKGROUND OF THE INVENTION

The present invention relates to apparatus for detecting leaks in a fluid delivery line through which fluid is intermittently delivered under pressure and particularly relates to improvements in leak detector apparatus of the type disclosed in the U.S. Pat. to Elmer M. Deters No. 3,183,723 issued May 18, 1965. As disclosed in that patent, a leak detecting valve apparatus is disposed in the fluid delivery line between an intermittently operated pump and a remote valved outlet, and the leak detector valve apparatus is arranged to initially pass a restricted flow of fluid into the delivery line to rapidly pressurize the line to an intermediate pressure range, and to thereafter restrict the flow of fluid into the delivery line to a rate equal to the maximum permissible leakage rate from the line so that the pressure in the delivery line will build up above the intermediate range only if there is no significant leakage from the line. If the pressure in the delivery line builds up above the intermediate range, then the valve is moved to its open position to allow substantially unrestricted flow through the line.

In the leak detector apparatus of the above patent, the leak detector valve directly controls the flow of fluid to the delivery line and the entire delivery flow must pass through the leak detector valve. In order to adapt the prior leak detector valves for handling larger flows, it was necessary to correspondingly increase the size of the leak detector valve. The leak detector valve must, however, very accurately meter the flow of fluid into the delivery line at a rate corresponding to the maximum permissible leakage rate, and the leak detector apparatus must sense and respond to relatively small changes in pressure during its operation. As the size of the leak detector valve is increased, the problems of maintaining accurately metered flow are also increased. Moreover, problems are also encountered due to pressure surges in the delivery line which may occur due to operation of the pump or the valve.

It is the object of the present invention to overcome the disadvantages of the prior leak detecting apparatus by providing an apparatus in which a main pressure responsive valve is used to control flow through the delivery line and the leak detector valve operates as a pilot to control application of pressure to the main valve.

Accordingly, the present invention provides a leak detecting apparatus including a main valve having an inlet and an outlet for passing fluid therethrough to the delivery line, a main valve member controlling flow through the main valve and connected to a pressure responsive member having one side exposed to pressure in a pressure chamber. Fluid from the main valve inlet is supplied through a control passage to the pressure chamber and a leak detector pilot valve has its inlet connected to the pressure chamber and its outlet connected to the outlet of the main valve for controlling the pressure on the pressure responsive member. The leak detector valve is operated when the pressure at the main valve outlet reaches a preselected intermediate range to restrict the flow of fluid into the delivery line to a rate equal to the maximum permissible leakage rate, and the leak detector pilot valve operates to open and thereby allow the main valve to open only if there is no substantial leakage from the delivery line. The main valve is advantageously constructed and arranged to inhibit leakage past the main valve due to pressure surges in the line.

A preferred embodiment of the invention is illustrated in the accompanying drawing wherein.

The leak detecting apparatus of the present invention is generally adapted for use in detecting leaks from a delivery line through which fluid is intermittently delivered under pressure and is herein shown and described in conjunction with a pumping system such as a gasoline dispensing system. As diagrammatically shown in FIG. 1, the pumping system includes a pump 10 for pumping liquid from a storage reservoir or tank T through a pump outlet line 11 to a delivery line 12 that extends to a remote outlet indicated at 13. A valve 14 is provided at the remote outlet and arranged to be closed when the pump is stopped. Provision is preferably made for preventing drainage of fluid from the delivery line 12 when the pump is stopped and, for this purpose, a check valve diagrammatically shown at 15 is provided adjacent the inlet end of the delivery line 12. In the pumping system, the pump 10 is intermittently operated to deliver fluid under pressure to the line 12 and is herein shown driven as by an electric motor 16. As diagrammatically shown in FIG. 1, operation of the motor is effected under the control of a switch 17 conveniently located adjacent the outlet valve 14, which switch is connected through a motor control unit 18 and conductors 19 to the motor 16 to start and stop the same. The leak detector apparatus 21 is located adjacent the inlet end of the delivery line and is operable to detect leakage from the delivery line downstream of the leak detector apparatus.

Figure 2:
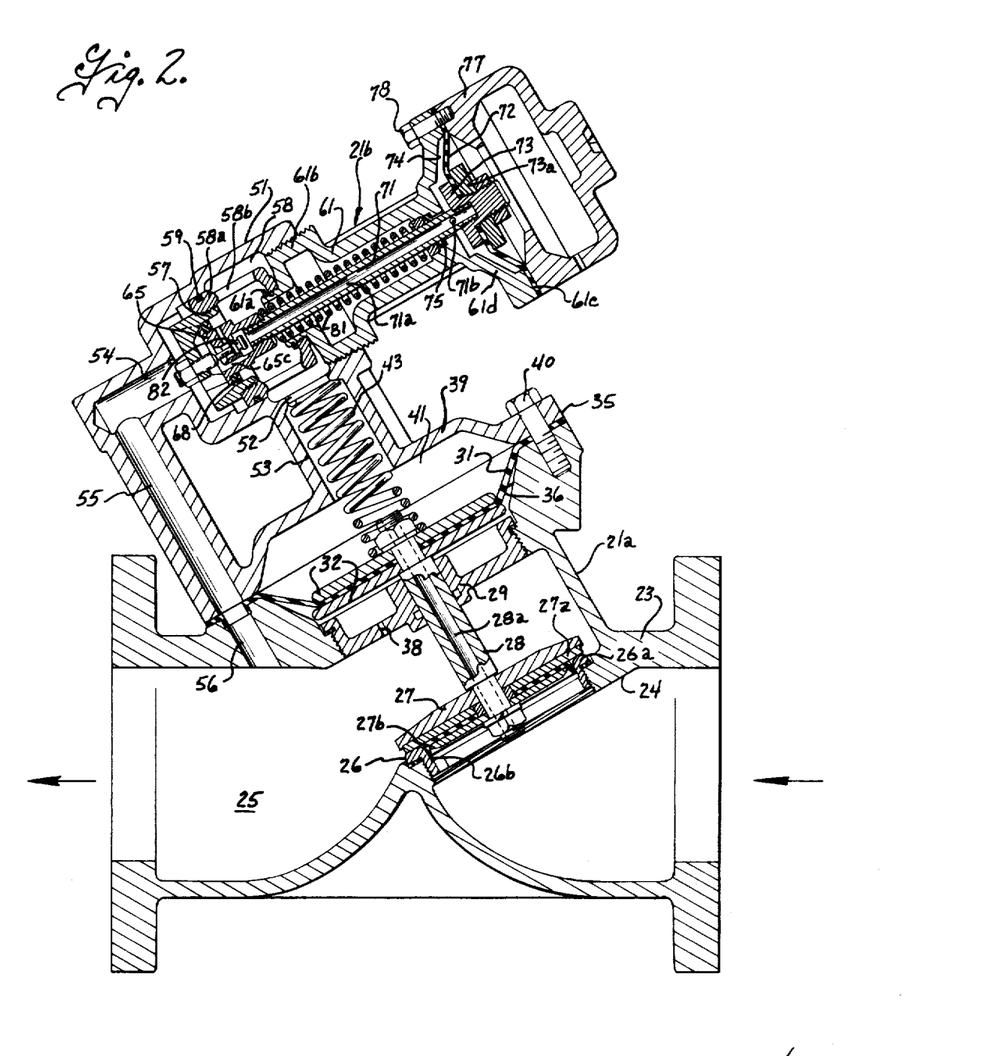
FIGS. 2, 3 and 4 are sectional views through the leak detecting apparatus illustrating the same in different positions.
Figures 3, 4:
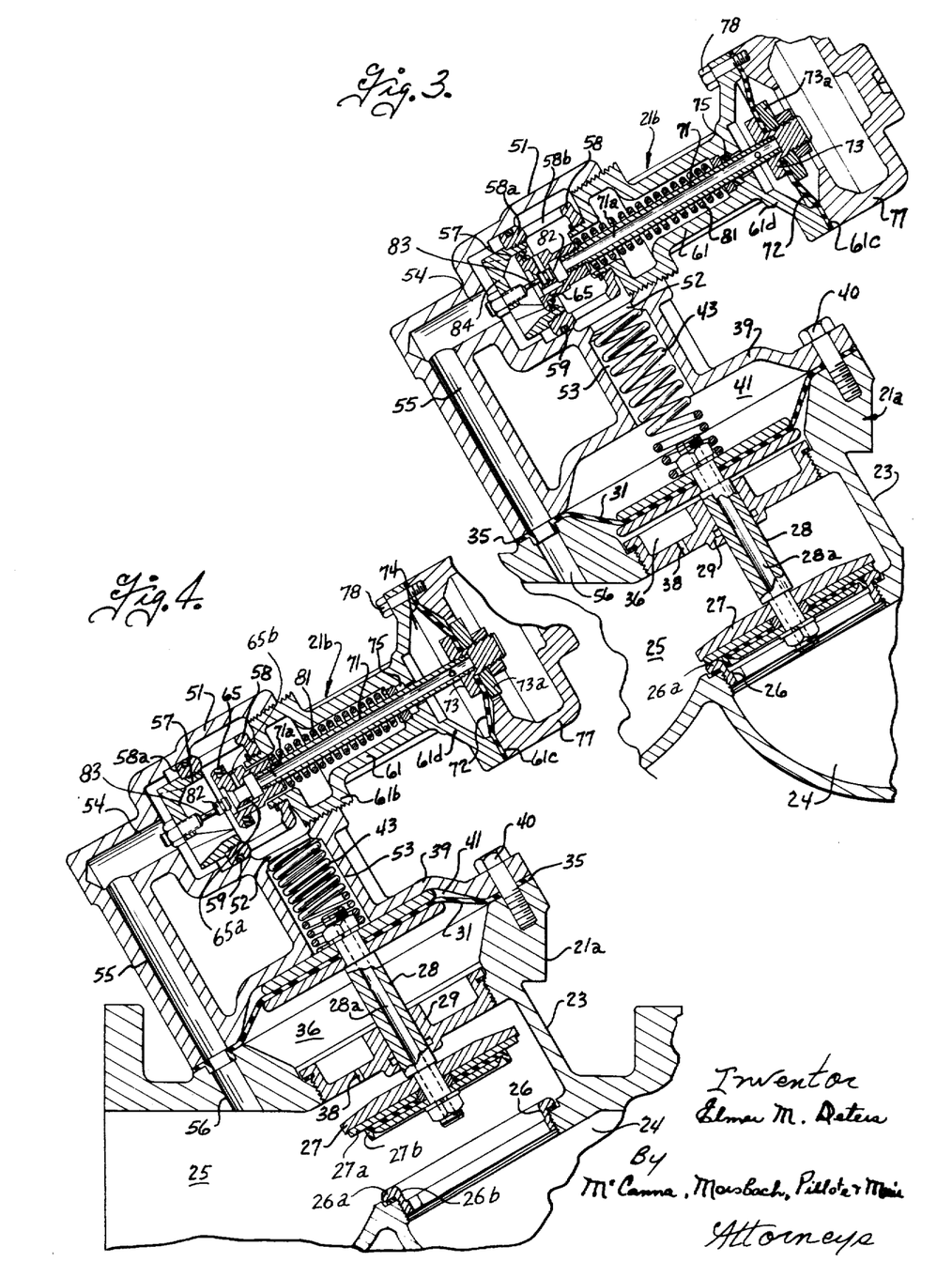

The leak detector apparatus is best shown in FIGS. 2–4 and includes a main valve 21a for controlling flow through the delivery line and a leak detector pilot valve 21b which meters fluid into the delivery line and also controls the application of fluid pressure to the pressure responsive operator for the main valve. The main valve 21a includes a valve casing 23 having an inlet chamber 24 adapted for connection to the pump outlet line 11 and an outlet chamber 25 adapted for connection to the delivery line 12, with a valve seat 26 intermediate the inlet and outlet chambers. A main valve member 27 cooperates with the seat 26 to control flow through the main valve and the main valve member is mounted by a stem 28 which is slidably supported in a guide 29 for movement into and out of position closing the valve seat. A pressure responsive operator conveniently in the form of a diaphragm 31 is connected to the stem 28 and diaphragm stabilizing plates 32 are preferably provided at opposite sides of the central portion of the diaphragm to confine flexing of the diaphragm to the outer annular portion of the same. The outer periphery of the diaphragm 31 is clamped to a flange 35 on the main valve casing and the underside of the diaphragm 31 is exposed to the fluid pressure in the outlet chamber 25. However, for reasons pointed out hereinafter, the stem guide 29 and main valve casing are arranged to form a substantially closed chamber 36 at the underside of the diaphragm, which chamber has restricted communication through passage 38 with the outlet chamber. Passage 38 restricts flow of fluid between the chamber 36 and the outlet chamber and provides a dash pot at the underside of the diaphragm for inhibiting rapid movement of the diaphragm and valve member in response to short duration pressure surges on the valve member or diaphragm. A cap 39 overlies the upper side of the diaphragm 31 to define a pressure chamber 41 and is attached to the valve casing by fasteners 40 to clamp the periphery of the diaphragm to the main valve casing. Fluid under pressure from the pump is supplied to the pressure chamber 41 through a control passage 28a advantageously formed in the valve stem. Passage 28a extends completely through the length of the stem and communicates the main inlet chamber 24 with the pressure chamber 41. As will be seen from the drawings, the main valve member is movable from its closed position shown in FIGS. 2 and 3, in the direction of fluid flow through the main valve, that is in a direction away from the inlet chamber 24 to its opened position shown at FIG. 4. The effective area of the diaphragm, that is the area inwardly of the flange 35 on the valve casing, is made substantially larger than the cross-sectional area of the valve seat 26 so that, when the valve is closed as shown in FIGS. 2 and 3, pressure from the inlet chamber 24 applied through passage 28a to the pressure chamber 41 will exert a closing force on the diaphragm and valve member that is greater than the force exerted on the valve member by the pressure at the inlet. In order to assure closing of the valve member when the pressures at opposite sides of the diaphragm are substantially equalized, a light compression spring 43 capable of exerting a few pounds force is provided and arranged to engage the upper end of the valve member to yieldably bias the valve member toward its closed position.

The main valve 27 normally moves to its closed position when the pump is shut down and, when the pump is thereafter started, the fluid under pressure from the pump is applied through the inlet chamber 24 to the underside of the valve member 27 and is simultaneously applied through passage 28a to the pressure chamber 41 at the diaphragm 31 to normally hold the main valve member in its closed position. The leak detector pilot valve 21b is arranged to pass a metered flow of liquid into the delivery line after the pump is started and the leak detector pilot valve controls the pressure in the main pressure chamber 41 to allow opening of the main valve in the absence of a leak. The pressure in the delivery line can drop to a relatively low value due to thermal contraction and the delivery line can even be substantially drained of liquid in the event of a leakage through check valve 15 back to the tank, or opening of the outlet valve 14 after the pump is stopped. The leak detector apparatus is accordingly advantageously arranged so that, when the pump is started, fluid is initially supplied to the delivery line at a relatively rapid rate to fill the line and bring the line up to an intermediate leak detecting pressure which is above atmospheric pressure and below pump delivery pressure when the outlet valve is closed. The leak detector apparatus thereafter meters fluid to the delivery line at a controlled rate corresponding to the maximum permissible leakage rate from the delivery line. If the leakage from the delivery line is less than the metered rate delivered by the leak detecting apparatus to the line, the pressure in the line will build up above the intermediate pressure, for example 10 *p.s.i. and the leak detector pilot valve is arranged to respond to the increase in pressure above the intermediate pressure to discharge fluid from the pressure chamber at a rate greater than the rate of flow of fluid into the pressure chamber through passage 28a.* This allows the main valve to open and pass full pump flow to the delivery line. On the other hand, if the leakage from the delivery line is in excess of the metered leakage rate passed by the leak detecting apparatus, then the pressure in the delivery line will not build up above the intermediate pressure range. The leak detector apparatus is arranged so as to thereafter operate, when the outlet valve 14 is opened, to pass fluid at a reduced rate to the delivery line so as to signal the operator that a leak does exist on the line. This rate, herein sometimes referred to as a signal rate, is selected so as to be substantially less than full pump delivery rates.

The leak detector pilot valve 21b is similar to the leak detector valve disclosed in the aforementioned U.S. Pat. No. 3,183,723 and such leak detectors can be adapted for use as leak detector pilot valves in the leak detecting apparatus of the present invention. In the embodiment shown, the leak detector pilot valve includes a pilot valve casing 51 having a pilot inlet 52 communicating through an open passage 53 with the main pressure chamber 41, and an outlet 54 communicates through passages 55 and 56 with the main outlet chamber 15. As shown, passage 55 is conveniently formed in a casting integral with the pilot valve casing 51 and passage 56 is formed in the main valve casing 21a, the peripheral portion of the diaphragm 35 operating to form a seal at the interface between the passages 55 and 56. The pilot valve includes a pilot valve seat 57 intermediate the pilot inlet and pilot outlet and, in the form shown, the seat 57 is mounted as by threaded engagement on an annular portion 58a of a cage-like member 58. The annular portion 58a is sealed to the pilot housing by an O-ring 59 intermediate the pilot inlet 52 and outlet 54 and the cage has openings 58b to pass fluid from the pilot inlet 52 to the valve seat 57. The cage is attached, as by threaded engagement with an end portion 61a of a diaphragm housing 61, and the diaphragm housing has an enlarged externally threaded portion 61b that is removably mounted in an opening in the pilot valve casing to allow removal of the cage 58 and seat 57 from the pilot valve casing.

The leak detector pilot valve 21b includes a valve mechanism which is operative to initially supply fluid to the delivery line at a rate in excess of the leakage rate, to rapidly fill the line, and which leak detector valve mechanism is thereafter operative, when the pressure in the delivery line reaches a preselected intermediate pressure such as 10 p.s.i., to restrict or meter the flow of fluid into the delivery line at a rate equal to the maximum permissible leakage rate, and to thereafter open the leak detector pilot valve if the pressure in the delivery line rises above the intermediate range, indicative of the absence of a significant leak from the line. In the embodiment shown, these several valving functions are performed by a dual valve mechanism best shown in FIGS. 5 and 6 and including a pilot valve member 65 which is adapted to span the seat 57 and which has means such as a packing ring 68 on its periphery to form a sliding seal with the seat 57. The packing 68 is arranged to seal the interface between the pilot valve member 65 and the seat 57, when the pilot valve member is in a position spanning the seat. However, a bypass valve is formed in the pilot valve member 65 and includes a valve bore 65a that extends axially through the valve member and a lateral passage 65b that communicates the bore 65a with the outer periphery of the valve member at the inlet side of the packing 68 so that, when the pilot valve member is in its closed position shown in FIG. 2, fluid from the pilot inlet 52 can pass through the openings 58b in the cage 58 and through lateral passage 65b and bore 65a to the pilot outlet. Bore 65b is dimensioned to pass fluid at a preselected rate sufficient to effect rapid filling of the delivery line, but substantially less than full pump flow and has a flow area which is substantially smaller than the flow area of passage 28a that supplies fluid from the main inlet chamber 24 to the pressure chamber 41 so that the pressure in chamber 41 is not reduced significantly below inlet pressure during flow through the bypass passage 65b.

The pilot valve member has a pressure responsive operator which responds to the pressure in the main outlet chamber 25 and hence to the pressure in the delivery line. As shown, the pilot valve member is connected by a stem 71 to a pressure responsive member herein shown in the form of a diaphragm 72. The stem is attached to the diaphragm by diaphragm reinforcing members 73 and 73a which overlie opposite sides of the central portion of the diaphragm 72, and the periphery of the diaphragm 72 is attached to a flange 61c on a cup-shaped head 61d on the housing 61. The diaphragm and head 61d define a pressure motive chamber 74 at one side of the diaphragm and the other side of the diaphragm is vented to atmosphere. As shown, the diaphragm is clamped to the flange 71 by a vented cap 77 and fasteners 78. A sealing gland 75 is provided on the diaphragm housing to slidably engage the stem 71 and form a seal between the housing and stem. Fluid under pressure from the delivery line is applied to the chamber 74 for operating the pilot valve and in the form shown, the stem 71 is provided with an axial passage 71a that communicates at one end through lateral opening 71b with the pilot pressure chamber 74 and which communicates at its other end through a passage 65c in the pilot valve member 65, with the pilot outlet 54. As previously described, the pilot outlet 54 communicates through passages 55 and 56 with the main outlet chamber 25 and delivery line 12.

Figures 1, 5, 6, 7:
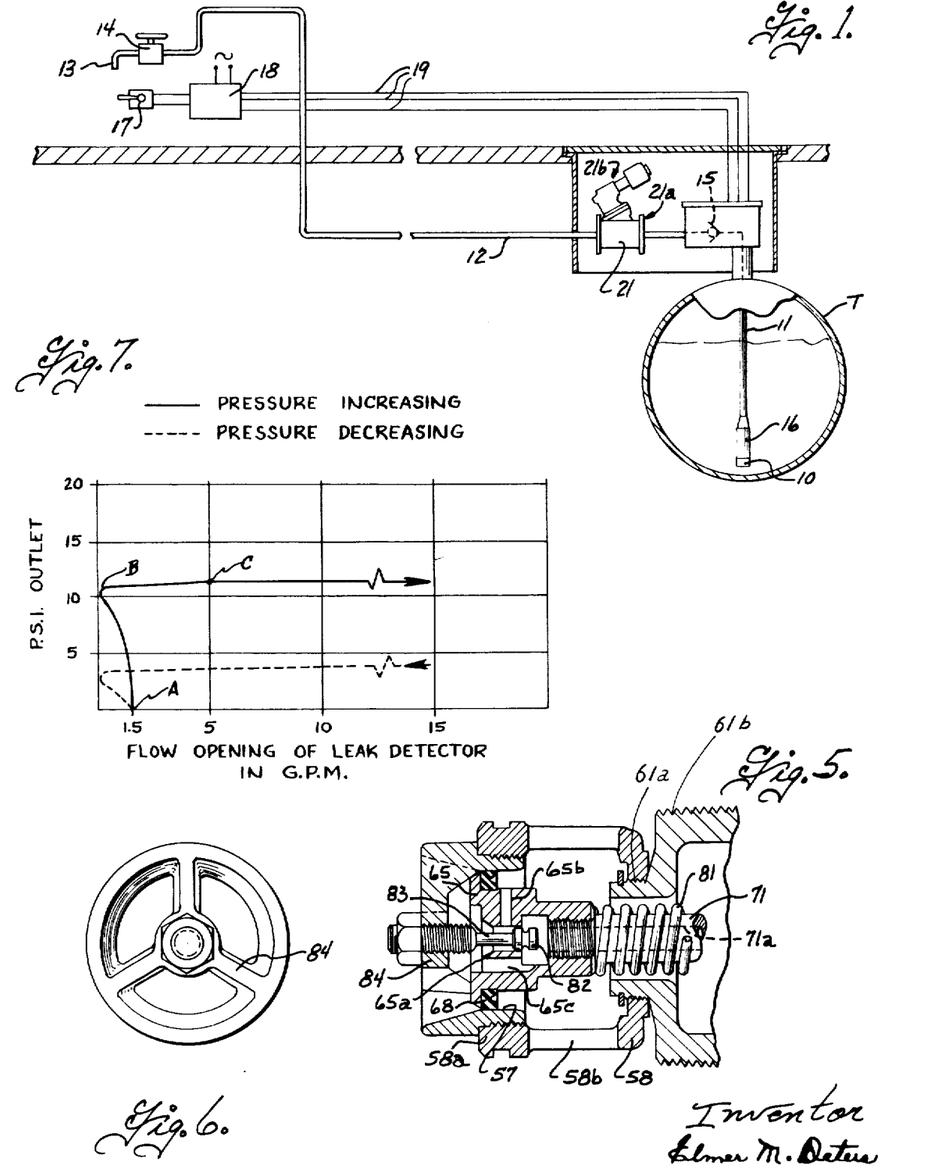
FIG. 1 is a diagrammatic view of a pumping system having a leak detecting apparatus of the present invention embodied therein.
FIG. 5 is a fragmentary sectional view through the leak detector valve showing the parts on an enlarged scale.
FIG. 6 is an end view of the leak detecting valve shown in FIG. 5.
FIG. 7 is a graph illustrating the relationship between the flow opening of the leak detector, expressed in terms of gallons per minute, and the pressure in the delivery line.

The pilot valve member 65 is yieldably urged to its closed position by a spring 81 interposed between the valve member and the diaphragm housing 61, and the diaphragm 72 is made substantially larger than the effective cross-sectional area of the pilot valve member 65 and such as to cause movement of the pilot valve member from its fully closed position shown in FIG. 2, to an intermediate position shown in FIG. 3 when the pressure in the chamber 74 reaches a preselected intermediate pressure between atmospheric pressure and a full pump discharge pressure. A valve member 82 (FIG. 5) herein shown in the form of a small spool is provided for restricting the flow of fluid through the bypass passage 65b and bore 65a when the pilot valve member is moved to its intermediate position. As best shown in FIG. 5, the bypass valve member 82 is connected by a stem 83 to a support structure 84 conveniently formed integrally with the valve seat 57. The valve member 82 remains stationary during movement of the pilot valve 65 and, when the latter reaches its intermediate position shown in FIG. 3, the spool extends across the inner end of the lateral passage 65b. The spool is made slightly smaller than the valve bore 65a to provide a restricted flow passage therearound, of the order of a few thousandths of an inch, and sufficient to pass only a restricted flow equal to the maximum permissible leakage rate. Thus, when the pilot valve member is in its intermediate position shown in FIG. 3, fluid from the pilot inlet is passed at a restricted rate equal to the maximum permissible leakage rate, for example of the order of a few hundredths of a gallon per minute from the pilot inlet to the pilot outlet for flow into the delivery line. If the pressure in the delivery line builds up above the intermediate pressure at which the valve member moves to its intermediate position, then this pressure is applied to diaphragm 72 and operates to move the pilot valve member to its open position shown in FIG. 4. When the pilot valve is in its open position, it provides a flow passage between the pilot inlet and the pilot outlet which is substantially larger than flow passage 28a so that the pressure chamber 41 is vented to the main outlet chamber to thereby substantially equalize pressures on opposite sides of the main pressure responsive member 31. The main valve member can then move to its open position to allow full pump flow to the delivery line. As will be seen, the pump inlet pressure is applied to the underside of the main valve member 27 and, when the pressures on opposite sides of the diaphragm 31 are equalized, the main valve member can move to its open position with only a small difference in pressure between the main inlet and outlet chambers 24 and 25. On the other hand, if the pressure in the delivery line does not build up above the intermediate pressure range in response to passage of fluid at the leakage rate into the delivery line, or if the outlet valve 14 is opened before the leak detector pilot valve moves to its open position, then the leak detector pilot valve will move back to its initial position shown in FIG. 2. In this position, the bypass valve 82 uncovers the bypass passage 65b and allows fluid at a controlled rate to pass into the delivery line.

If the delivery line is full when the pump is started, only a relatively small quantity of fluid for example, of the order of 1 pint, must be supplied to the delivery line in order to bring it up to the intermediate leak sensing range. Any leakage past the main valve member when it is closed, or any flow which may occur past the main valve member due to pressure surges in the line, could build up the pressure in the delivery line above the intermediate leak sensing range and thus bypass operation of the leak detector pilot valve. The dash pot effect produced by the restricted passage 38 between chamber 36 and the outlet chamber 25 inhibits rapid movement of the main valve member and materially assists in avoiding spurious opening of the main valve member due to pressure surges which may be caused by starting of the pump, or opening of the delivery valve.

The main valve member 27 and valve seat 26 are constructed and arranged to provide a face type seal therebetween and for this purpose, the valve seat 26 has an annular valve face 26a that cooperates with a resilient valve face 27a on the valve member. In addition, valve seat 26 is advantageously formed with an axial valve face 26b and the valve member 27 is formed with a lip 27b that cooperates with the axial sealing surface 26b to form a sliding seal therebetween during initial movement of the valve member relative to the valve seat. The lip 27b thus inhibits leakage past the main valve member in the event the main valve member is shifted slightly relative to the seat due to a pressure surge. In addition, it forms a second sealing surface to aid in preventing leakage at this point.

OPERATION

In describing an operating cycle of the apparatus, it is assumed that the pump is stopped, the shut off valve 14 is closed, and that the pressure in the line 12 has reduced to substantially atmospheric pressure either due to thermal contraction in the delivery line or leakage at the check valve 15 or due to opening of the outlet valve 14 after the pump stopped. When the pump is thereafter started in response to closing of the switch 17, the pump will rapidly build up the pressure in the inlet chamber 24 of the leak detecting apparatus. This pressure is applied to the underside of the valve member 27 and is also applied through passage 28a to the pressure chamber 41. Since the diaphragm 31 has an area substantially greater than the area on the valve member 27 that is exposed to inlet pressure, the pressure on the diaphragm normally tends to hold the valve closed. The leak detector apparatus controls flow to the delivery line when the pump is started in a manner generally depicted by the solid line curve in FIG. 7. Assuming the pressure in the delivery line is initially below the intermediate leak sensing range, the leak detector pilot valve will initially be in the position shown in FIG. 2 opening the bypass passage 65b and allowing fluid to flow into the outlet chamber 25 and delivery line 12 at a signal rate indicated at A in the graph of FIG. 7 to rapidly fill the delivery line and build up the pressure in the line to the intermediate pressure range. As the pressure in the line builds up to the intermediate pressure range, it operates on the pilot diaphragm 72 to move the pilot valve member 65 to its intermediate position shown in FIG. 3. In this position, flow through the bypass passage 65b is restricted by the valve member 82 to a rate equal to the maximum permissible leakage rate indicated at B in the graph of FIG. 7. Fluid at the leakage rate continues to flow into the delivery line through the leak detector pilot valve and, in the absence of a significant leak from the line, the pressure will build up above the intermediate pressure range. As previously described, the pilot diaphragm 72 is proportioned so that, when the pressure in the aforementioned intermediate pressure range is applied to the diaphragm, it is sufficient to overcome the closing pressure of spring 81 and the pressure unbalance on the pilot valve member due to the differential between inlet and delivery line pressure acting on opposite sides of the pilot valve. When the pilot valve reaches its open position, the fluid pressures on opposite sides of the pilot valve member are equalized so that the pilot valve will rapidly move to its open position and then remain in its open position until the pressure in the delivery line drops to a pressure substantially below the intermediate pressure range.

As the pilot valve moves to its open position, it moves past a position such as indicated at C in FIG. 7 in which flow from the main pressure chamber 41 through the pilot valve exceeds flow into the chamber 41 through passage 28a so that pressure in the chamber 41 is reduced and the main valve member can then move to its open position due to the inlet pressure acting on the underside of the main valve member 27. If there is a leak from the delivery line in excess of the aforementioned leakage rate, or if the outlet valve 14 is opened before the pilot valve is opened, then the pressure in the delivery line will not build up to the intermediate pressure range. Accordingly, if the main valve is opened under these conditions, only fluid which passes through passage 28a, chamber 41 and bypass passage 65b, can flow into the delivery line. As previously described, bypass passage 65b limits the flow of fluid to a signal rate such as indicated at A in FIG. 7, which signal rate is substantially below full pump discharge and thus signals the operator that there is a leak from the line.

When the pump is shut off, the pressure in the delivery line can again decrease due to thermal contraction in the line or due to leakage from the line or past the check valve 15. However, as previously described, the pressure unbalance on the pilot valve member 65 is equalized when the pilot valve is in its open position so that the pilot valve does not close until the pressure drops to a pressure substantially below the intermediate pressure at which the pilot valve opens. The dashed curve in FIG. 7 generally illustrates the relationship between the flow opening through the leak detector apparatus and the pressure in the delivery line, when the pressure in the delivery line decreases after the pump is shut off.

While a preferred embodiment of the present invention has herein been illustrated and described, it has been done by way of illustration and the invention should not be limited except as required by the scope of the appended claims.

The embodiments of the invention in which an exclusive property or privilege is claimed are defined as follows:

1. An apparatus for detecting leakage in excess of a preselected leakage rate from a fluid delivery line through which fluid is intermittently delivered under pressure and wherein the pressure in the line can vary over a wide range between a low pressure and a relatively higher delivery pressure, said apparatus comprising a casing having a main inlet chamber and a main outlet chamber adapted to pass fluid therethrough to the delivery line and a main valve seat intermediate said main inlet and main outlet chambers, a main valve member controlling flow through said main valve seat, and mounted for movement in the direction of fluid flow through the valve to its open position, a main pressure chamber, a main pressure responsive member having one side exposed to pressure in the main pressure chamber and the other side exposed to pressure in the main outlet chamber, means connecting said main pressure responsive member to said main valve member for moving said main valve member to a closed position in response to a preselected pressure differential between the main pressure chamber and the main outlet chamber, control passage means communicating said main pressure chamber with said main inlet chamber and dimensioned to pass fluid from the main inlet chamber to the main pressure chamber at a rate in excess of said preselected leakage rate, a leak detector pilot valve including a pilot valve casing having a pilot inlet communicating with said main pressure chamber and a pilot outlet communicating with said main outlet chamber, pressure responsive pilot valve means for controlling flow between said pilot inlet and pilot outlet and operative to provide a restricted flow passage between said pilot inlet and said pilot outlet to pass fluid at said preselected leakage rate when the pressure in said main outlet chamber reaches a preselected intermediate range between said low pressure and said delivery pressure, said pressure responsive pilot valve means being operative when the pressure in said main outlet chamber rises above said intermediate range to open and provide a flow passage therethrough which is relatively unrestricted as compared to said control passage means whereby to substantially equalize the pressure in said main pressure chamber with the pressure in said main outlet chamber and allow said main valve member to open.

2. In an apparatus for detecting leakage in excess of a preselected leakage rate from a fluid delivery line through which fluid is intermittently delivered under pressure and wherein the pressure in the line can vary over a wide range between a low pressure and a relatively higher delivery pressure, said apparatus comprising, a casing having a main inlet chamber and a main outlet chamber adapted to pass fluid therethrough to the delivery line and a main valve seat intermediate said main inlet and main outlet chambers, a main valve member controlling flow through said main valve seat and mounted for movement in the direction of fluid flow through the valve to its open position, a main pressure chamber, and a main pressure responsive member having one side exposed to pressure in said main pressure chamber and the other side exposed to pressure in said main outlet chamber, means connecting said main pressure responsive member to said main valve member for moving the latter to a closed position in response to a preselected pressure differential between the main pressure chamber and the main outlet chamber, control passage means communicating said main outlet chamber with said main pressure chamber to apply fluid pressure to said main pressure responsive member for holding said main valve member in its closed position, pressure responsive control means operative when the main valve member is in its closed position and the pressure in the main outlet chamber is below a preselected intermediate pressure range for passing fluid at a preselected signal rate from the main inlet to the main outlet to allow the pressure in said main outlet chamber to rapidly build up to said preselected intermediate pressure range, said pressure responsive control means including means operative when the pressure in said main outlet chamber reaches said preselected intermediate pressure range to restrict flow from said main inlet to said main outlet to said preselected leakage rate, said pressure responsive control means including means operative when the pressure in the main outlet chamber rises above said intermediate pressure range to pass fluid from said main pressure chamber to said main outlet chamber at a rate greater than the rate of flow of fluid through said control passage means into said main pressure chamber to thereby substantially equalize pressures on opposite sides of said pressure responsive member and allow said main valve member to open.

3. In an apparatus for detecting leakage in excess of a preselected leakage rate from a fluid delivery line through which fluid is intermittently delivered under pressure and wherein the pressure in the line can vary over a wide range between a low pressure and a relatively higher delivery pressure, said apparatus comprising, a casing having a main inlet chamber and a main outlet chamber adapted to pass fluid therethrough to the delivery line and a main valve seat intermediate said main inlet and main outlet chambers, a main valve member controlling flow through said main valve seat and mounted for movement in the direction of fluid flow through the valve to its open position, a main pressure chamber, and a main pressure responsive member having one side exposed to pressure in said main pressure chamber and the other side exposed to pressure in said main outlet chamber, means connecting said main pressure responsive member to said main valve member for moving the latter to a closed position in response to a preselected pressure differential between the main pressure chamber and the main outlet chamber, control passage means communicating said main outlet chamber with said main pressure chamber and dimensioned to pass fluid to the main pressure chamber at a rate in excess of a preselected signal rate, a leak detector pilot valve including a pilot valve casing having a pilot inlet communicating with said main pressure chamber and a pilot outlet communicating with said main outlet chamber, pressure operated pilot valve means controlling flow between said pilot inlet and said pilot outlet operative when the pressure in said main outlet chamber is below a preselected intermediate pressure range to pass fluid at said preselected signal rate from said main pressure chamber to said main outlet chamber, said pressure operated pilot valve means being operative when the pressure in said main outlet chamber reaches said intermediate pressure range to restrict flow between the pilot inlet and the pilot outlet to said preselected leakage rate, said pressure operated pilot valve means being operative when the pressure in said main outlet chamber rises above said preselected intermediate pressure range to open and pass fluid from the main pressure chamber at a rate greater than the rate of fluid flow through said control passage to thereby allow said main valve member to open.

4. An apparatus according to claim 3 including means defining a second chamber at said other side of the pressure responsive member, nd means providing restricted communication between said second chamber and said main outlet chamber to inhibit rapid movement of said main pressure responsive member and main valve member.

5. An apparatus according to claim 3 wherein said main valve member has means cooperating with said main valve seat to provide a sliding seal therebetween during initial movement of the main valve member relative to the main valve seat.

6. In an apparatus for detecting leakage in excess of a preselected leakage rate from a fluid delivery line through which fluid is intermittently delivered under pressure and wherein the pressure in the line can vary over a wide range between a low pressure and a relatively higher delivery pressure, said apparatus comprising, a casing having a main inlet chamber and a main outlet chamber adapted to pass fluid therethrough to the delivery line and a main valve seat intermediate said main inlet and main outlet chambers, a main valve member controlling flow through said main valve seat and mounted for movement in the direction of fluid flow through the valve to its open position, a main pressure chamber, and a main pressure responsive member having one side exposed to pressure in said main pressure chamber and the other side exposed to pressure in said main outlet chamber, means connecting said main pressure responsive member to said main valve member for moving the latter to a closed position in response to a preselected pressure differential between the main pressure chamber and the main outlet chamber, control passage means communicating said main outlet chamber with said main pressure chamber and dimensioned to pass fluid to the main pressure chamber at a rate in excess of said preselected leakage rate, a leak detector pilot valve including a pilot valve casing having a pilot inlet communicating with said main pressure chamber and a pilot outlet communicating with said main outlet chamber, pilot valve means controlling flow from said pilot inlet to said pilot outlet, means responsive to the pressure in said main outlet chamber for positioning said pilot valve means in an initial position when the pressure in said main outlet passage is below a preselected intermediate pressure range between said low pressure and said delivery pressure, said pressure responsive means being operative to move said valve means to an intermediate position when the pressure in said main outlet passage is in said intermediate range and to an open position when the pressure in the main outlet passage is above said intermediate range, said pilot valve means being operative in said initial position to define an initial flow passage between said pilot inlet and pilot outlet that is smaller than control passage means to pass fluid at a rate in excess of said preselected leakage rate to said main outlet chamber to rapidly fill the delivery line, said pilot valve means including means operative when the pilot valve means is in said intermediate position to define an intermediate flow passage between said pilot inlet and pilot outlet which is smaller than said initial flow passage to pass fluid at said preselected leakage rate to said main outlet chamber to increase the pressure in said main outlet chamber if the leakage from the delivery line is less than said preselected leakage rate, said pilot valve means including means operative in said open position to define a flow passage between said pilot inlet and pilot outlet which is larger than said control passage to substantially equalize the pressure in said main pressure chamber with the pressure in said main outlet chamber.

7. An apparatus according to claim 6 wherein said control passage comprises a passage formed in said means connecting said main pressure responsive member to said main valve member.

8. An apparatus according to claim 6 including means defining a second chamber at said other side of said main pressure responsive member, and means providing restricted communication between said second chamber and said main outlet chamber to inhibit rapid movement of said main pressure responsive member and said main valve member.

9. An apparatus according to claim 8 wherein said main valve member has means cooperating with said main valve seat to provide a sliding seal therebetween during initial movement of said main valve member relative to said seat.

10. An apparatus according to claim 6 wherein said main valve member has means cooperating with said main valve seat to provide a sliding seal therebetween during initial movement of said main valve member relative to said seat.

11. In a pumping system including a delivery line, a flow control valve means at one end of the line for controlling flow therefrom, pump means communicating with the other end of the delivery line operable to intermittently deliver fluid under pressure to the line whereby the pressure in the line can vary from full pump delivery pressure when the pump is operating and the flow control valve means is closed to a relatively low pressure when the pump is stopped, means for detecting leakage in excess of a preselected leakage rate from the delivery line comprising a casing having a main inlet chamber communicating with the outlet of the pump and a main outlet chamber communicating with the delivery line to pass fluid thereto, a main valve seat intermediate said main inlet and main outlet chambers, a main valve member controlling flow through said main valve seat and mounted for movement in the direction of fluid flow through the valve to its open position, a main pressure chamber, and a main pressure responsive member having one side exposed to pressure in said main pressure chamber and the other side exposed to pressure in said main outlet chamber, means connecting said main pressure responsive member to said main valve member for moving the latter to a closed position in response to a preselected pressure differential between the main pressure chamber and the main outlet chamber, control passage means communicating said main outlet chamber with said main pressure chamber and dimensioned to pass fluid to the main pressure chamber at a rate in excess of said preselected leakage rate, a leak detector pilot valve including a pilot valve casing having a pilot inlet communicating with said main pressure chamber and a pilot outlet communicating with said main outlet chamber, pilot valve means controlling flow from said pilot inlet to said pilot outlet, means responsive to the pressure in said main outlet chamber for positioning said pilot valve means in an initial position when the pressure in said main outlet passage is below a preselected intermediate pressure range between said low pressure and said delivery pressure, said pressure responsive means being operative to move said valve means to an intermediate position when the pressure in said main outlet passage is in said intermediate range and to an open position when the pressure in the main outlet passage is above said intermediate range, said pilot valve means being operative in said initial position to define an initial flow passage between said pilot inlet and pilot outlet that is smaller than control passage means to pass fluid at a rate in excess of said preselected leakage rate to said main outlet chamber to rapidly fill the delivery line, said pilot valve means including means operative when the pilot valve means is in said intermediate position to define an intermediate flow passage between said pilot inlet and pilot outlet which is smaller than said initial flow passage to pass fluid at said preselected leakage rate to said main outlet chamber to increase the pressure in said main outlet chamber if the leakage from the delivery line is less than said preselected leakage rate, said pilot valve means including means operative in said open position to define a flow passage between said pilot inlet and pilot outlet which is larger than said control passage to substantially equalize the pressure in said main pressure chamber with the pressure in said main outlet chamber.

* * * * *